(12) United States Patent
Datta et al.

(10) Patent No.: US 7,337,202 B2
(45) Date of Patent: Feb. 26, 2008

(54) SHIFT-AND-NEGATE UNIT WITHIN A FUSED MULTIPLY-ADDER CIRCUIT

(75) Inventors: Ramyanshu Datta, Austin, TX (US); Robert Kevin Montoye, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 762 days.

(21) Appl. No.: 10/745,712

(22) Filed: Dec. 24, 2003

(65) Prior Publication Data
US 2005/0144214 A1 Jun. 30, 2005

(51) Int. Cl.
*G06F 15/00* (2006.01)
(52) U.S. Cl. ...................................................... 708/209
(58) Field of Classification Search ........ 708/200–209, 708/700–714
See application file for complete search history.

(56) References Cited

U.S. PATENT DOCUMENTS

| | | | | |
|---|---|---|---|---|
| 3,701,976 A * | 10/1972 | Shively | ...................... | 708/209 |
| 3,790,960 A * | 2/1974 | Amdahl et al. | ............. | 708/209 |
| 4,583,197 A * | 4/1986 | Chappell et al. | ............ | 708/209 |
| 4,931,971 A * | 6/1990 | Cook et al. | ................. | 708/209 |
| 5,020,013 A * | 5/1991 | Maher et al. | ................ | 708/209 |
| 5,262,971 A * | 11/1993 | Yamaguchi | ................. | 708/209 |
| 5,633,819 A * | 5/1997 | Brashears et al. | .......... | 708/505 |
| 5,957,997 A * | 9/1999 | Olson et al. | ................. | 708/205 |
| 6,122,651 A * | 9/2000 | Mahurin | ...................... | 708/209 |
| 6,178,437 B1* | 1/2001 | Dhong et al. | ............... | 708/505 |
| 6,360,238 B1* | 3/2002 | Dhong et al. | ............... | 708/205 |
| 6,393,446 B1* | 5/2002 | Dhong et al. | ............... | 708/209 |
| 6,415,308 B1* | 7/2002 | Dhablania | .................... | 708/204 |
| 7,024,439 B2* | 4/2006 | Hoskote | ...................... | 708/211 |

* cited by examiner

*Primary Examiner*—Chat C. Do
(74) *Attorney, Agent, or Firm*—Casimer K. Salys; Dillon & Yudell LLP

(57) ABSTRACT

A low-power shift-and-negate unit within a fused multiply-adder circuit is disclosed. The shift-and-negate unit includes a large shift stage, a coarse shift stage, a negate stage and a fine shift stage. The large shift stage receives a first set of shift signals and a group of data signals to generate a group of first intermediate signals. The coarse shift stage receives a second set of shift signals and the group of first intermediate signals to generate a group of second intermediate signals and their complement signals. The large shift stage and the coarse shift stage are executed within a first single processor cycle. The negate stage receives a complement decision signal and the group of second intermediate signals along with their complement signals to generate a group of third intermediate signals. Finally, the fine shift stage receives a third set of shift signals and the group of third intermediate signals to generate a group of output signals. The negate stage and the fine shift stage are executed within a second single processor cycle.

14 Claims, 5 Drawing Sheets

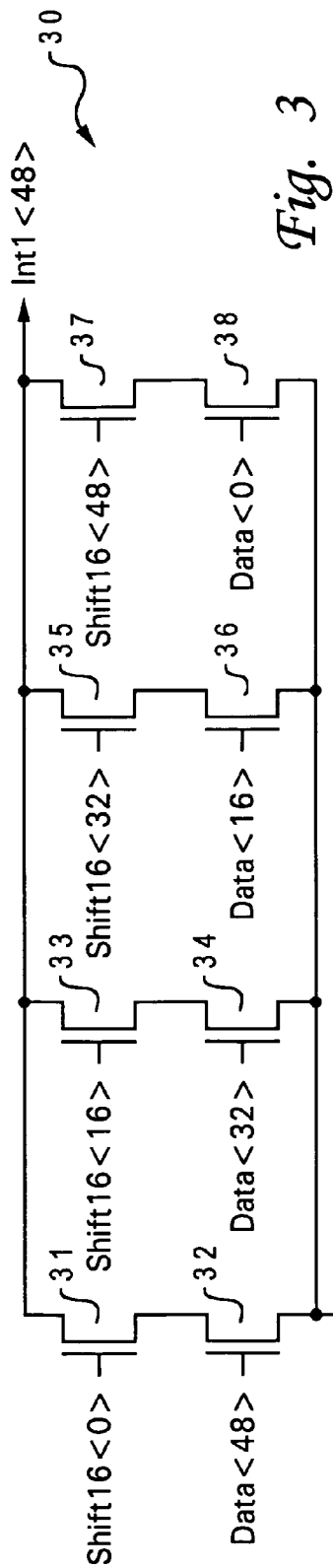
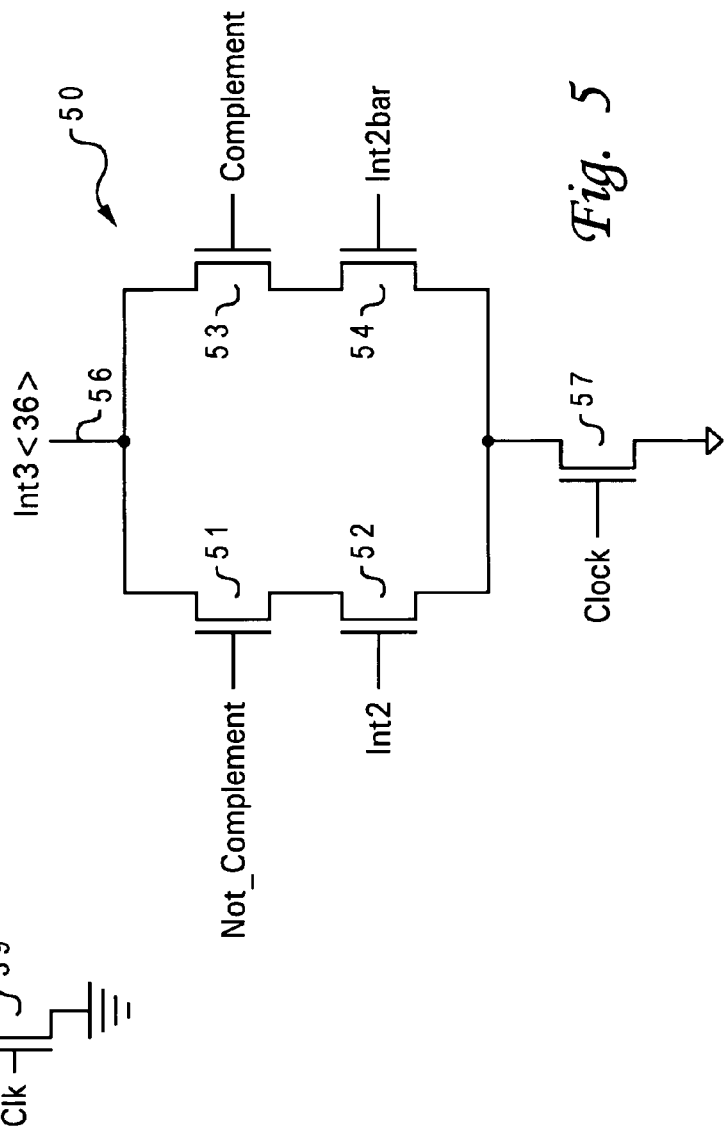
Fig. 3
Fig. 5

SHIFT-AND-NEGATE UNIT WITHIN A FUSED MULTIPLY-ADDER CIRCUIT

BACKGROUND OF THE INVENTION

1. Technical Field

The present invention relates to digital circuits in general, and, in particular, to fused multiply-adder circuits. Still more particularly, the present invention relates to a low-latency low-power shift and negate unit within a fused multiply-adder circuit.

2. Description of Related Art

A floating-point unit is typically required to perform various mathematical operations on floating-point numbers. It is always useful to enhance the speed of floating-point functions and one known technique is to provide specialized hardware to implement certain floating-point functions. For example, a fused multiply-adder circuit can be used in a floating-point unit to perform multiply-accumulate functions that are commonly used in digital signal processing operations.

A fused multiply-adder circuit basically combines a multiplication operation with an add operation. Within a fused multiply-adder circuit, a multiplicand and a multiplier are initially multiplied via a partial product generation module. The partial products are then added by a partial product reduction module that reduces the partial products to a Sum and a Carry in their redundant form. The redundant Sum and Carry are further added to an addend via a carry-save adder to form a second redundant Sum and a second redundant Carry. The second redundant Sum and the second redundant Carry are subsequently added within a carry-propagate adder to yield a Sum Total.

The present disclosure provides a low-latency low-power shift-and-negate unit within a fused multiply-adder circuit.

SUMMARY OF THE INVENTION

In accordance with a preferred embodiment of the present invention, a shift-and-negate unit within a fused multiply-adder circuit includes a large shift stage, a coarse shift stage, a negate stage and a fine shift stage. The large shift stage receives a first set of shift signals and a group of data signals to generate a group of first intermediate signals. The coarse shift stage receives a second set of shift signals and the group of first intermediate signals to generate a group of second intermediate signals and their complement signals. The large shift stage and the coarse shift stage are executed within a first single processor cycle. The negate stage receives a complement decision signal and the group of second intermediate signals along with their complement signals to generate a group of third intermediate signals. Finally, the fine shift stage receives a third set of shift signals and the group of third intermediate signals to generate a group of output signals. The negate stage and the fine shift stage are executed within a second single processor cycle.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 3 is a circuit diagram of a basic block within a large shift stage of the shift-and-negate module from FIG. 2, in accordance with a preferred embodiment of the present invention;

FIG. 5 is a circuit diagram of a basic block within a negate stage of the shift-and-negate module from FIG. 2, in accordance with a preferred embodiment of the present invention.

DETAILED DESCRIPTION OF A PREFERRED EMBODIMENT

Generally speaking, a fused multiply-adder circuit executes a multiply-accumulate operation within a single operation as $$S=(A \times B)+C$$

Thus, a fused multiply-adder circuit is designed to accept up to three operands as inputs. If certain instructions need fewer than three operands, then a constant is forced into the unused operand. For example, if only the addition of A and C is required, then a constant 1.0 is forced into operand B. The basic principle of operations of a fused multiply-adder can be divided into three separate tasks, as follows:

1. parallel calculation of the true mantissa and exponent;
2. bit alignment of the values to be added (pre-normalization); and
3. addition followed by post normalization.

Figure 1:
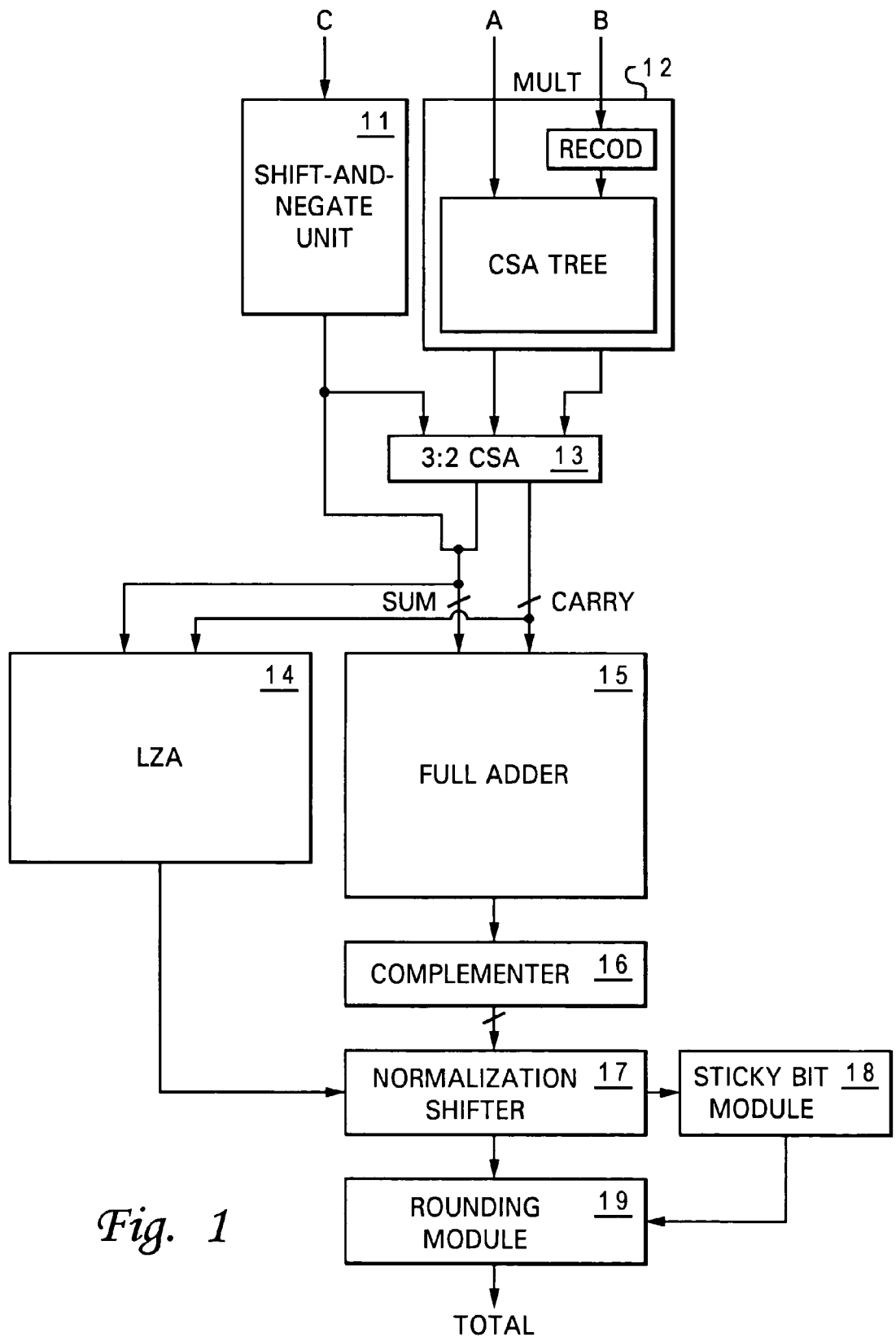
FIG. 1 is a block diagram of a fused multiply-adder in accordance with a preferred embodiment of the present invention.

Referring now to the drawings and in particular to FIG. 1, there is depicted a block diagram of a fused multiply-adder in accordance with a preferred embodiment of the present invention. As shown, a fused multiply-adder includes a shift-and-negate module 11, a multiplication module 12, a 3-to-2 carry-save adder (CSA) 13, a leading zero anticipator (LZA) 14, a full adder 15, a complementer 16, a normalization shifter 17, a sticky bit module 18 and a rounding module 19. The fused multiply-adder performs a multiply-accumulate operation by initially multiplying a multiplicand A and a multiplier B within multiplication module 12 to produce an intermediate product A×B in a carry-save representation. Within the same pipeline stage, addend C undergoes a bit inversion and bit alignment via shift-and-negate module 11. The bit alignment is performed by placing addend C to the left of the most significant bit of the intermediate product A×B. Two extra bits are placed between addend C and the intermediate product A×B to allow for correct rounding. 3-to-2 CSA 13 is a standard CSA having three inputs and two outputs, the two outputs being the sum and carry outputs. The aligned addend C is added to the carry-save representation of the intermediate product A×B. Since the product A×B has 106 bits in the present embodiment, only the least significant 106 bits of the aligned addend C are used as inputs to 3-to-2 CSA 13. The most significant 55 bits of the aligned addend C are then concatenated at the output of 3-to-2 CSA 13 to obtain a 161-bit sum.

The outputs of 3-to-2 CSA 13 are applied to full adder 15 that adds the sum and carry results from 3-to-2 CSA 13. Although not shown, full adder 15 also includes a carry-in input for receiving a carry-in, and a carry-out output for providing a carry-out if the result of the add operation generates a carry-out. Complementer 16 receives the output of full adder 15 and complements the values received. LZA 14 recognizes the leading zeroes of the sum and carry outputs from 3-to-2 CSA 13. In conjunction with LZA 14, normalization shifter 17 eliminates leading zeroes of the output from complementer 16 by shifting the mantissa as well as incrementing or decrementing the exponent accordingly in order to maximize the accuracy of the output from complementer 16. Rounding module 19 provides the rounding that is required to conform the significance of the multiply-add operation to the required precision, often the original precision of the inputs.

As mentioned above, shift-and-negate module 11 performs bit inversions and bit alignments. Within shift-and-negate module 11, an alignment shifter can be implemented with n-channel shift circuits that allow wide ORing within the function. The method of shifting used by the alignment shifter can be called partial decode or modulo shifting because of its unique multi-stage structure with partial shift groups.

Figure 2:
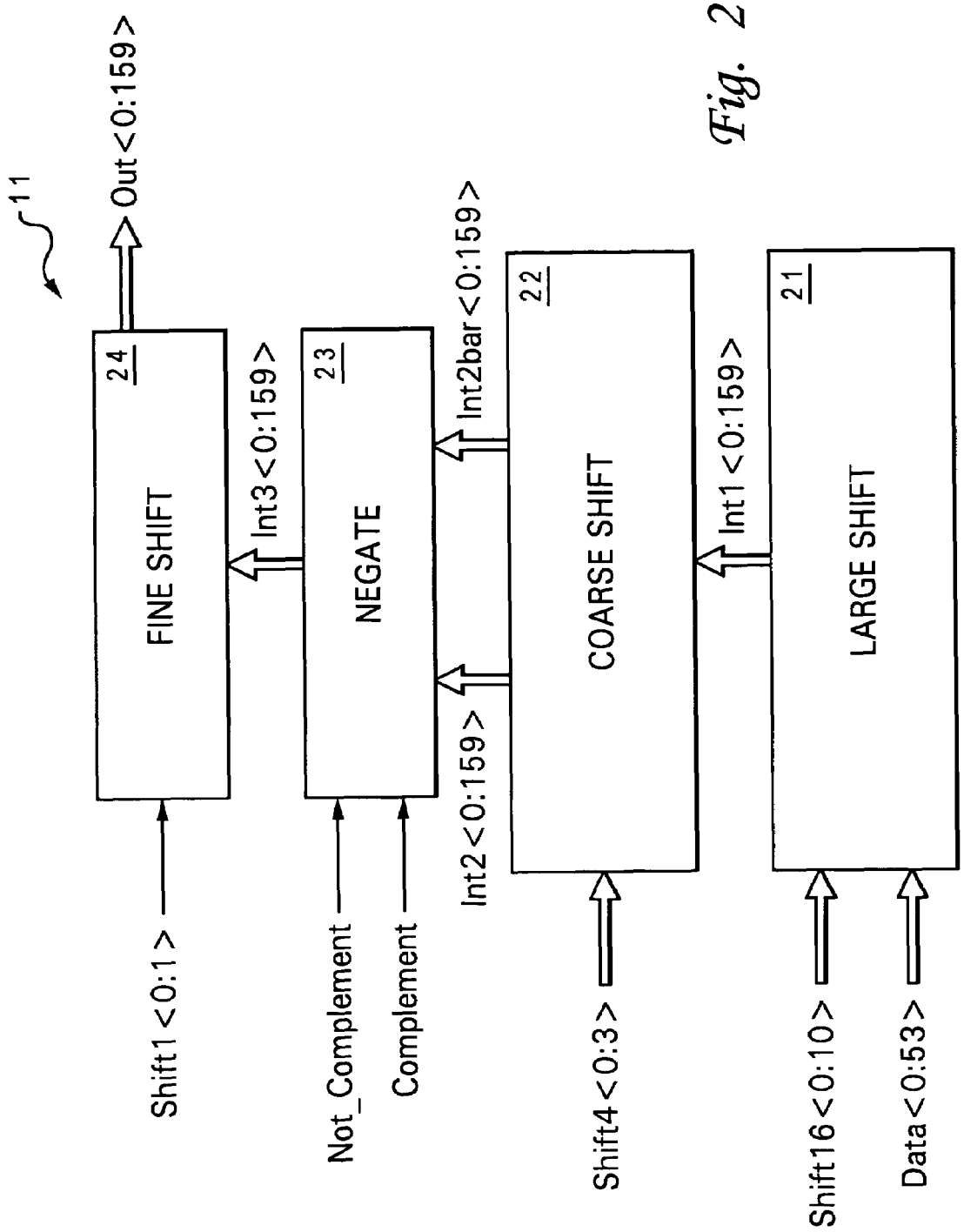
FIG. 2 is a block diagram of a shift-and-negate module within the fused multiply-adder from FIG. 1, in accordance with a preferred embodiment of the present invention.

With reference now to FIG. 2, there is depicted a block diagram of shift-and-negate module 11, in accordance with a preferred embodiment of the present invention. As shown, shift-and-negate module 11 includes four stages, namely, a large shift stage 21, a coarse shift stage 22, a negate stage 23 and a fine shift stage 24. In the embodiment shown in FIG. 2, large shift stage 21 receives shift-16 signals Shift16<0:10> and data signals Data<0:53> to generate first intermediate signals Int1<0:159>. Coarse shift stage 22 receives shift-4 signals Shift4<0:3> and the first intermediate signals Int1<0:159> to generate second intermediate signals Int2<0:159> and their complements Int2bar<0:159>. Negate stage 23 receives a complement decision signal (i.e., either complement or not_complement) and the second intermediate signals Int2<0:159> along with corresponding complements Int2bar<0:159> to generate third intermediate signals Int3<0:159>. Fine shift stage 24 receives shift-1 signals Shift1<0:1> and the third intermediate signals Int3<0:159> to generate output signals Out<0:159> for shift-and-negate module 11.

A. Large Shift Stage

Large shift stage 21 shifts data in multiples of 16-bit positions up to a maximum of 160 bit positions. Referring now to FIG. 3, there is depicted a circuit diagram of a basic block within large shift stage 21, in accordance with a preferred embodiment of the present invention. As shown, a large shift circuit 30 for generating the $48^{th}$ bit of first intermediate signals Int1<0:159> includes n-channel transistors 31-39. Transistors 31-32 are connected in series, transistors 33-34 are connected in series, transistors 35-36 are connected in series and transistors 36-37 are connected in series. Transistors 31-32, transistors 33-34, transistors 35-36 and transistors 36-37 are connected in parallel with each other. A clock input is fed to the gate of transistor 39. Data inputs Data<0>, Data<16>, Data<32> and Data<48> are fed to the gates of transistors 38, 36, 34 and 33, respectively. Also, shift-16 control inputs Shift16<0>, Shift16<16>, Shift16<32> and Shift16<48> are fed to the gates of transistors 31, 33, 35 and 37, respectively. Shift-16 control inputs Shift16<0>, Shift16<16>, Shift16<32> and Shift16<48> control the shifting of Data<> by 0, 16, 32 or 48 positions, respectively. In turn, transistors 31-38 provide the $48^{th}$ bit of the first intermediate signals Int1<0:159>.

For each basic block within large shift stage 21, the alignments of the shift-16 control inputs and the data inputs dictate the bit position of the first intermediate signals Int1<0:159> at the output of the basic block. In the exemplary circuit shown in FIG. 3, the output is for the $48^{th}$ bit position because Shift16<0> is aligned with Data<48>, Shift16<16> is aligned with Data<32>, Shift16<32> is aligned with Data<16> and Shift16<48> is aligned with Data<38>. As another example, a basic block within large shift stage 21 having Shift16<0> aligned with Data<73>, Shift16<16> aligned with Data<57>, Shift16<32> aligned with Data<41> and Shift16<48> aligned with Data<25> generates the $73^{th}$ bit of the first intermediate signals Int1<0:159> at the output of the basic block.

B. Coarse Shift Stage

Figure 4:
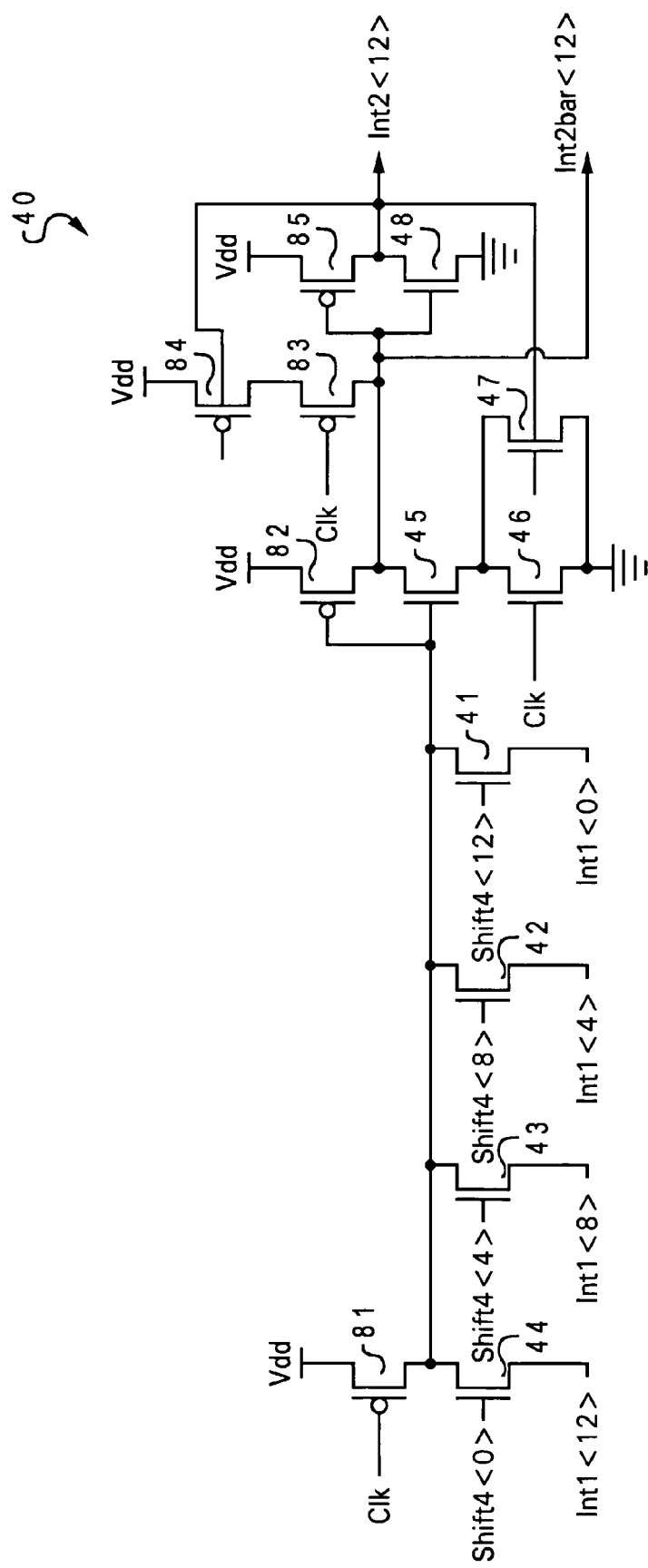
FIG. 4 is a circuit diagram of a basic block within a coarse shift stage of the shift-and-negate module from FIG. 2, in accordance with a preferred embodiment of the present invention.

Coarse shift stage 22 shifts data in multiples of 4-bit positions up to a maximum of 12 bit positions. With reference now to FIG. 4, there is depicted a circuit diagram of a basic block within coarse shift stage 22, in accordance with a preferred embodiment of the present invention. As shown, a coarse shift circuit 40 for generating the $12^{th}$ bit of the second intermediate signals Int2<0:159> includes n-channel transistors 41-48 and p-channel transistors 81-85. Coarse shift circuit 40 also generates the $12^{th}$ bit of the complements of the second intermediate signals Int2bar<0:159>. A clock signal is fed to the gates of transistors 46 and 81-83. Transistors 41-44 are connected in parallel to each other. Four of the first intermediate signals Int1<0:159> are connected to the drains of transistors 41-44. In the present example, Int1<0>, Int1<4>, Int1<8>, and Int1<12> are connected to the drains transistors 41-44, respectively. In addition, shift-4 control inputs Shift4<12>, Shift4<8>, Shift4<4> and Shift4<0> are fed to the gates of transistors 41-44, respectively. Shift-4 control inputs Shift4<0>, Shift4<4>, Shift4<8> and Shift4<12> control the shifting of input Int1<> by 0, 4, 8 or 12 bit positions, respectively. Coarse shift circuit 40 generates the $12^{th}$ bit of the second intermediate signals Int1<0:159>. In addition, coarse shift circuit 40 also generates the $12^{th}$ bit of the complements of the second intermediate signals Int2bar<0:159> at a node before an inverter formed by transistors 85 and 48.

In the present example, the input Int1<0> represents the $0^{th}$ bit for coarse shift stage 22. So the input Int1<0> is fed into a Shift4<0> input for $0^{th}$ output, a Shift4<4> input for the $4^{th}$ output (thus connecting bit 0 to bit 4 and achieving shift of 4 bits), a Shift4<8> input for the $8^{th}$ output, and a Shift4<12> input for the $12^{th}$ output. Each of Int1<1:159> is connected to the appropriate inputs to achieve the shifting of 0, 4, 8 or 12 bit positions.

For each basic block within coarse shift stage 22, the alignments of the shift-4 control inputs and the Int1<0:159> inputs dictate the bit position of the second intermediate signals Int2<0:159> (and complement signals Int2bar<0:159>) at the output of the basic block. In the exemplary circuit shown in FIG. 4, the output is for the $12^{th}$ bit position because Shift4<0> is aligned with Int1<12>, Shift4<4> is aligned with Int1<8>, Shift4<8> is aligned with Int1<4> and Shift4<12> is aligned with Int1<0>. As another example, a basic block within coarse shift stage 22 having Shift4<0> aligned with Int1<52>, Shift4<4> aligned with Int1<48>, Shift4<8> aligned with Int1<44> and Shift4<12> aligned with Int1<40> generates the 52$^{th}$ bit of second intermediate signals Int2<0:159> (as well as the corresponding complement signal) at the output of the basic block.

The basic blocks of large shift stage 21 and coarse shift stage 22 share the same clock. As such, large shift stage 21 and coarse shift stage 22 are executed concurrently within the same processor cycle. In other words, the second intermediate signals Int2<0:159> and their complements Int2bar<0:159> are generated within one processor clock cycle from the Data<0:159> inputs.

C. Negate Stage

For the present embodiment, negate stage 23 has 160 negate units to decide whether or not each of the corresponding second immediate results Int2 should be complemented. Referring now to FIG. 5, there is depicted a circuit diagram of a negate unit within negate stage 23, in accordance with a preferred embodiment of the present invention. As shown, a negate unit 50 includes n-channel transistors 51-54 and 57. Transistors 51-52 are connected in parallel with transistors 53-54. An input Int2<36>, which is one of the 160 non-complemented outputs of coarse shift stage 22, is connected to the gate of transistor 52. Similarly, the input Int2bar<36>, which is one of the 160 complemented outputs of coarse shift stage 22, is connected to transistor 54. A pair of complement decision inputs, complement and not-complement, are connected to the gates of transistors 53 and 51, respectively. Depending on whether the operation require Int2<36> to be complement or not, one of the complement decision inputs will be asserted to allow either Int2<36> or Int2bar<36> to pass as Int3<36>. Such scheme removes the need for inverters with large drive capability as they are required in the prior art.

The outputs of negate stage 23, which are third intermediate results Int3<0:159>, are subsequently fed into fine shift stage 24.

D. Fine Shift Stage

Figure 6:
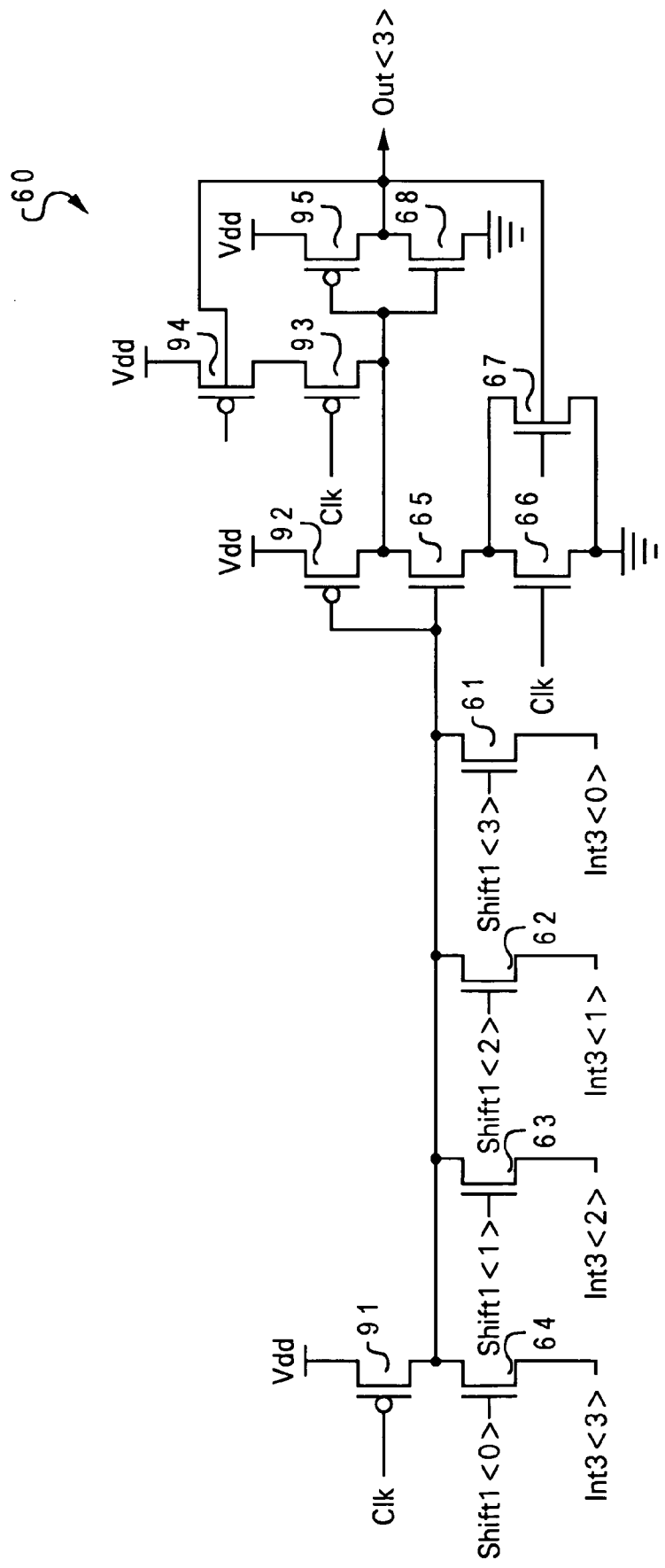
FIG. 6 is a circuit diagram of a basic block within a fine shift stage of the shift-and-negate module from FIG. 2, in accordance with a preferred embodiment of the present invention.

Fine shift stage 24 shifts the third intermediate results Int3<0:159> by 0, 1, 2 or 3 bit positions. With reference now to FIG. 6, there is depicted a circuit diagram of a basic block within fine shift stage 24, in accordance with a preferred embodiment of the present invention. As shown, a fine shift circuit 60 for generating the 3$^{rd}$ bit of the output Out<0:159> includes n-channel transistors 61-68 and p-channel transistors 91-95. A clock signal is fed to the gates of transistors 66, 91- and 93. Transistors 61-64 are connected in parallel to each other. Four of the third intermediate signals Int3<0:159> are connected to the drains of transistors 61-64. In the present example, Int3<0>, Int3<1>, Int3<2>, and Int3<3> are connected to the drains transistors 61-64, respectively. In addition, shift-1 control inputs Shift1<3>, Shift1<2>, Shift1<1> and Shift1<0> are fed to the gates of transistors 61-64, respectively. Shift-1 control inputs Shift1<0, Shift1<1>, Shift1<2> and Shift1<3> control the shifting of input Int3<> by 0, 1, 2 or 3 bit positions, respectively. Fine shift circuit 60 generates the 3$^{rd}$ bit of the out signals Out<0:159>.

For each basic block within fine shift stage 24, the alignments of the shift-1 control inputs and the Int3<0:159> inputs dictate the bit position of the output signals Out<0:159> at the output of the basic block. In the exemplary circuit shown in FIG. 6, the output is for the 3$^{rd}$ bit position because Shift1<0> is aligned with Int3<3>, Shift1<1> is aligned with Int3<2>, Shift1<2> is aligned with Int3<1> and Shift1<3> is aligned with Int3<0>. As another example, a basic block within fine shift stage 24 having Shift1<0> aligned with Int3<52>, Shift1<1> aligned with Int3<51>, Shift1<2> aligned with Int3<50> and Shift1<3> aligned with Int3<49> generates the 52$^{th}$ bit of the output signals Out<0:159> at the output of the basic block.

The basic blocks of negate stage 23 and fine shift stage 24 share the same clock. As such, negate stage 23 and fine shift stage 24 are executed concurrently within the same processor cycle. In other words, the output signals Out<0:159> are generated within one processor clock cycle from the second intermediate signals Int2<0:159> and their complements Int2bar<0:159>.

As has been described, the present invention provides a low-latency low-power shift-and-negate unit within a fused multiply-adder. The shift-and-negate unit of the present invention eliminates the need for a separate inversion unit that is required in the prior art shift-and-negate units.

While the invention has been particularly shown and described with reference to a preferred embodiment, it will be understood by those skilled in the art that various changes in form and detail may be made therein without departing from the spirit and scope of the invention.

What is claimed is:

1. A shift-and-negate circuit within a fused multiply-adder circuit, said shift-and-negate circuit comprising:
 a large shift circuit for receiving a first set of shift signal inputs and a plurality of data signal inputs to generate a plurality of first intermediate signals;
 a coarse shift circuit for receiving a second set of shift signal inputs and said plurality of first intermediate signals to generate a plurality of second intermediate signals along with their complement signals, wherein said large shift circuit and said coarse shift circuit perform executions within a first processor cycle, wherein said large shift circuit and said coarse shift circuit share a common processor clock cycle;
 a negate circuit for receiving a complement decision signal input and said plurality of second intermediate signals along with their complement signals to generate a plurality of third intermediate signals, wherein said complement decision signal includes a complement signal and a not complement signal; and
 a fine shift circuit for receiving a third set of shift signal inputs and said plurality of third intermediate signals to generate a plurality of signal outputs to be utilized by said fused multiply-adder circuit, wherein said negate circuit and said fine shift circuit share a common processor clock cycle, wherein said negate circuit and said fine shift circuit perform executions within a second processor cycle immediately after said first processor cycle, such that a separate inversion circuit is not required for said shift-and-negate circuit.

2. The shift-and-negate circuit of claim 1, wherein said first set of shift signal inputs direct said large shift circuit to shift data in multiples of 16-bit positions.

3. The shift-and-negate circuit of claim 2, wherein said plurality of data signal inputs are sent to said large shift circuit in multiples of 16-bit positions.

4. The shift-and-negate circuit of claim 1, wherein said second set of shift signal inputs direct said coarse shift circuit to shift data in multiples of 4-bit positions.

5. The shift-and-negate circuit of claim 4, wherein said plurality of first intermediate signals are sent to said coarse shift circuit in multiples of 16-bit positions.

6. The shift-and-negate circuit of claim 1, wherein said third set of shift signal inputs direct said fine circuit to shift data by 0, 1, 2 or 3 bit positions.

7. The shift-and-negate circuit of claim 6, wherein each of said plurality of third intermediate signals is sent to said fine shift circuit in each of a corresponding bit position.

8. A fused multiply-adder apparatus comprising:
a multiplier circuit for multiplying a first binary number input and a second binary number input to generate a set of partial products of said first binary number input and said second binary number layer;
a shift-and-negate circuit for shifting a third binary number input, wherein said shift-and-negate circuit includes
a large shift amplifier for receiving a first set of shift signals and said third binary number input to generate a plurality of first intermediate signals;
a coarse shift circuit for receiving a second set of shift signals and said plurality of first intermediate signals to generate a plurality of second intermediate signals along with their complement signals, wherein said large shift circuit and said coarse shift circuit share a common processor clock cycle, wherein said large shift circuit and said coarse shift circuit perform executions within a first processor cycle;
a negate circuit for receiving a complement decision signal and said plurality of second intermediate signals along with their complement signals to generate a plurality of third intermediate signals, wherein said complement decision signal includes a complement signal and a not complement signal; and
a fine shift circuit for receiving a third set of shift signals and said plurality, of third intermediate signals to generate a shifted third binary number, wherein said negate circuit and said fine shift circuit share a common processor clock cycle, wherein said negate circuit and said fine shift circuit perform executions within a second processor cycle immediately after said first processor cycle;
a carry-save adder circuit connected to said multiplier circuit and said shift-and-negate circuit, for combining said set of partial products of said first binary number input and said second binary number input with said shifted third binary number to produce a redundant Sum and a redundant Carry; and
an adder circuit for adding said redundant Sum and said redundant Carry to yield a Sum Total output.

9. The fused multiply-adder apparatus of claim 8, wherein said first set of shift signals direct said large shift circuit to shift data in multiples of 16-bit positions.

10. The fused multiply-adder apparatus of claim 9, wherein said third binary number is sent to said large shift circuit in multiples of 16-bit positions.

11. The fused multiply-adder apparatus of claim 8, wherein said second set of shift signals direct said coarse shift circuit to shift data in multiples of 4-bit positions.

12. The fused multiply-adder apparatus of claim 11, wherein said plurality of first intermediate signals are sent to said coarse shift circuit in multiples of 16-bit positions.

13. The fused multiply-adder apparatus of claim 8, wherein said third set of shift signals direct said fine shift circuit to shift data by 0, 1, 2 or 3 bit positions.

14. The fused multiply-adder apparatus of claim 13, wherein each of said plurality of third intermediate signals is sent to said fine shift circuit in each of a corresponding bit position.

* * * * *